United States Patent Office 2,713,995
Patented July 26, 1955

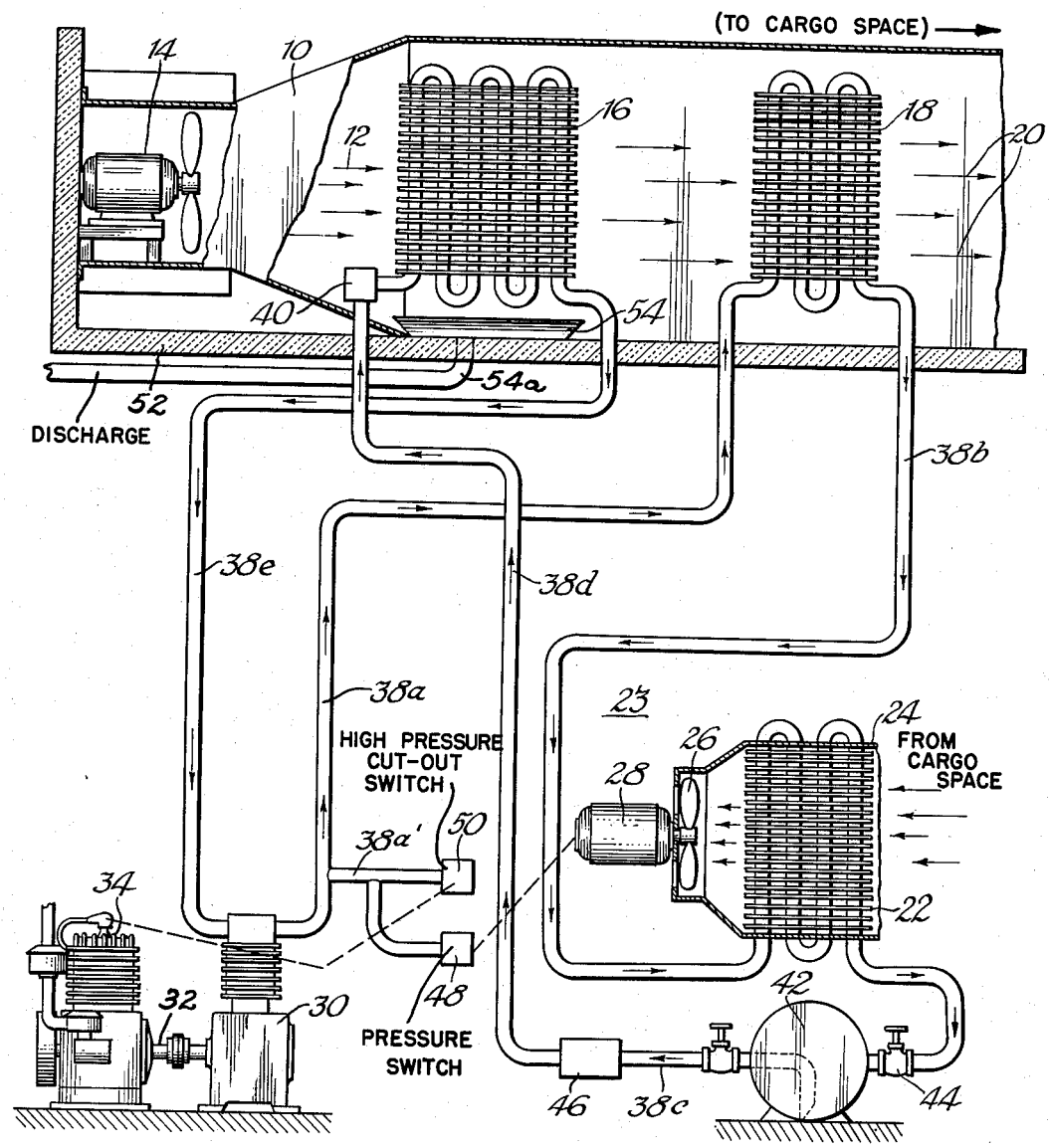

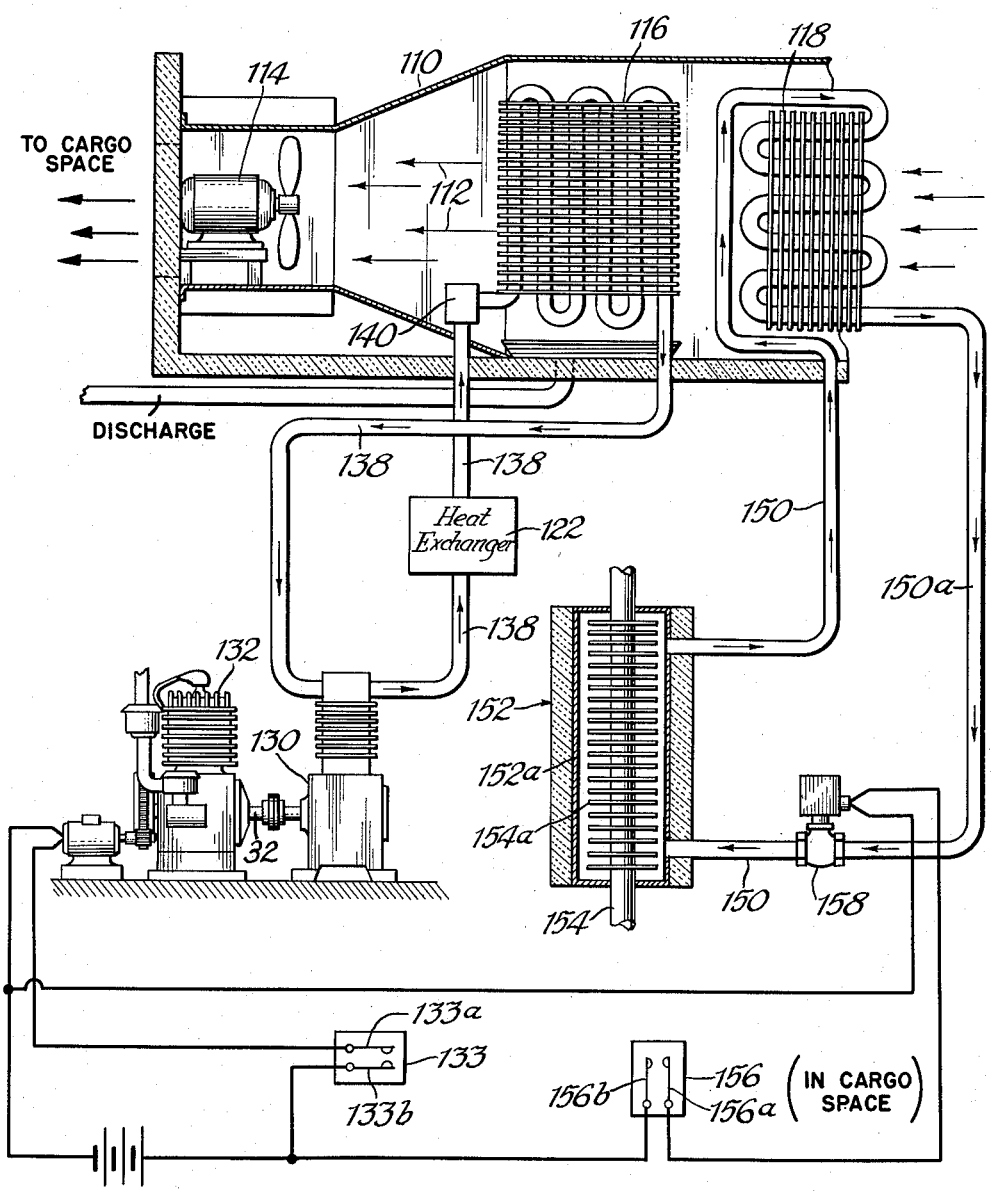

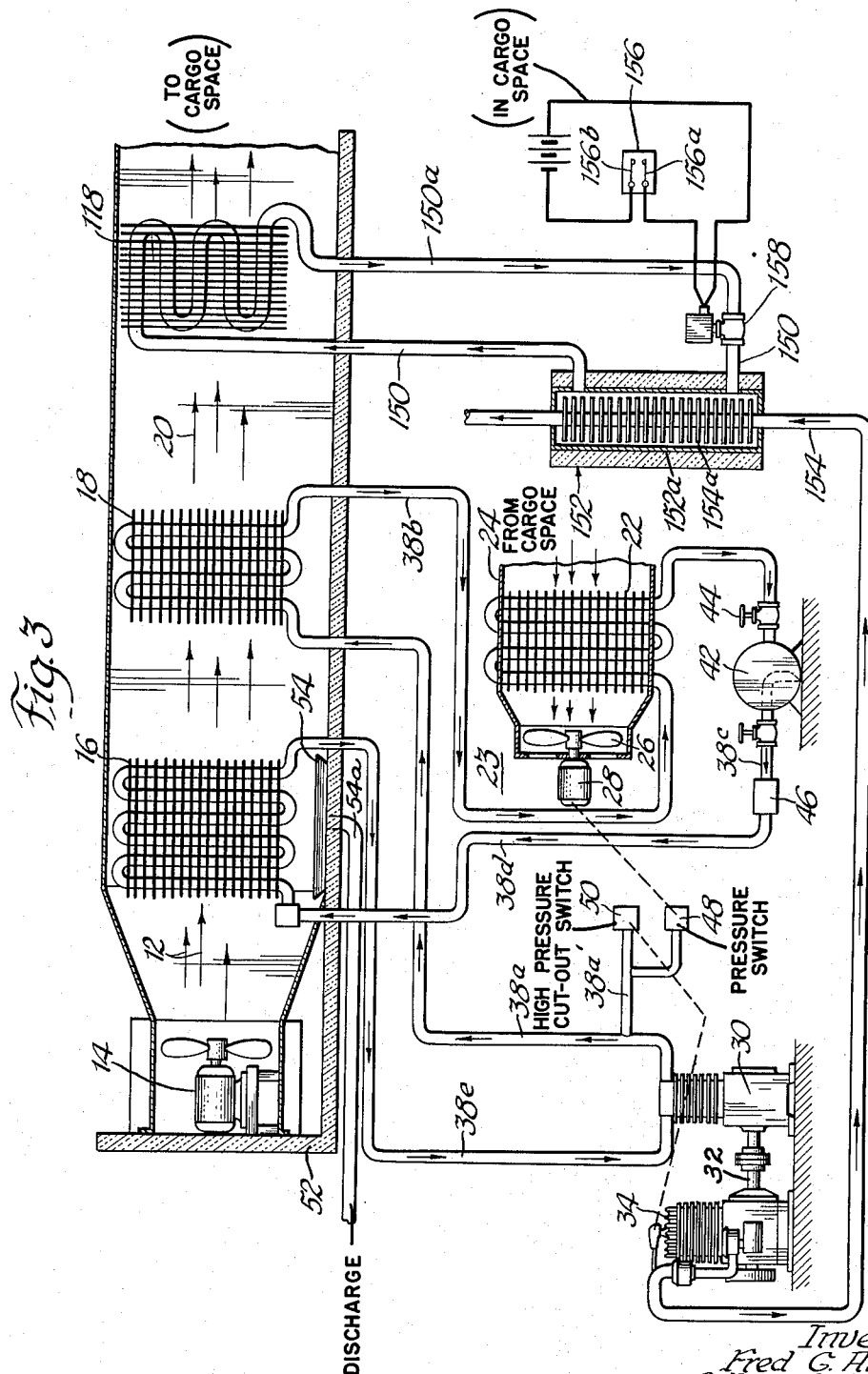

2,713,995

AIR HEATING AND COOLING SYSTEM

Fred G. Arkoosh and Gilbert E. Carpenter, Omaha, Nebr., assignors to Wilkinson Manufacturing Company, Omaha, Nebr., a corporation of Nebraska Application May 14, 1951, Serial No. 226,262

10 Claims. (Cl. 257—3)

This invention relates to an improved apparatus selectively operable to heat or to refrigerate a confined space, such as the interior of a truck, railroad car, or similar vehicle.

Trucks, railroad cars and the like vehicles are frequently called upon to carry perishable cargoes through regions having widely varying temperatures while at the same time maintaining the temperature of the cargo within rather narrow temperature limits conducive to preservation of cargo. When the car or truck travels through warm regions, attainment of the necessary cargo temperature demands refrigeration or transfer of heat from the relatively cool cargo to the relatively warm atmosphere at a rate sufficient to compensate for heat transmission through the walls into the car or truck. When the car or truck travels through a cool region, it is necessary to heat the cargo to compensate for the heat losses to the cooler atmosphere.

The above-described variations in the conditions to which trucks and railroad cars are subjected require the use of both heating and refrigerating equipment. However, since such equipment necessarily adds to the dead weight of the vehicle and requires valuable cargo space, it is highly desirable to provide light, compact, installations and separate heating and refrigerating systems cannot efficiently be used.

It is also highly desirable in heating and cooling systems for trucks and railroad cars to provide simple, reliable, and yet wholly automatic mechanisms which can be set in operation at the beginning of a trip with the assurance that, regardless of the temperature conditions encountered during the trip, the cargo will be maintained within the desired limits.

In accordance with the present invention, unitary systems are provided to heat or to refrigerate the cargo in a vehicle in response to the outside temperature conditions. These systems are entirely automatic in operation and operate as heaters or refrigerators as required without any attention on the part of the operator.

It is therefore a general object of the present invention to provide a unitary mechanism automatically operable to heat or cool a cargo to maintain the same within preset temperature limits.

Another object of the present invention is to provide a mechanism automatically operable to heat or cool a cargo to maintain the temperature thereof within preset limits and characterized by low weight and small space requirements, together with simplicity and reliability of operation.

Further it is an object of the present invention to provide an improved mechanism operable to heat or cool cargo to maintain the temperature thereof within preset limits utilizing a unitary mechanism for heating or cooling as required.

Still another object of the present invention is to provide an improved mechanism to heat the confined cargo space of a truck or railroad car capable of extracting heat from engine exhaust gases and suitable for use in conjunction with a cargo cooling mechanism.

Further it is an object of the present invention to provide an improved mechanism operable to heat or cool the confined cargo space of a truck or railroad car and capable of extracting excess moisture from air entering the space during both heating and refrigerating operations.

Additionally, it is an object of the present invention to provide an improved unitary mechanism operable automatically to heat or cool a cargo space as required to maintain the cargo temperature in a desired temperature range and utilizing only simple, reliable, pressure sensitive elements for control.

The novel features which we believe to be characteristic of our invention are set forth with particularity in the appended claims. Our invention itself, however both as to its organization and method of operation, together with further objects and advantages thereof, will best be understood by reference to the following description taken in connection with the accompanying drawings, in which:

Figure 1 is a somewhat diagrammatic view of a heating and refrigerating system constructed in accordance with one embodiment of the present invention;

Figure 2 is a similar view of a heating and refrigerating system constructed in accordance with another embodiment of the present invention; and Figure 3 is a diagrammatic view of a system combining the embodiments of Figures 1 and 2.

Referring now to Figure 1, there is shown at 10 a duct defining a passage for air flow into the confined cargo space of a truck or railroad car, air flow through the duct being in the direction of the arrows 12. A suitable fan 14 is provided to induce this flow from the outside air as shown at the broken away portion of the duct 10. The duct 10 is also broken away to show the evaporator heat exchanger 16 and the condenser heat exchanger 18 which are disposed in the duct to heat or cool the air travelling therethrough.

Air enters the duct 10 at the left hand side as seen in Figure 1 where the duct communicates with the outside air or with the interior of the confined cargo space, or both, as desired. Preferably, suitable intake and damper control elements (not shown) are provided to permit choice of either outside air or interior air, or both, to accommodate the characteristics of the cargo. Air is discharged from the right hand side of the duct 10 directly into the cargo space as indicated by arrows 20.

Since the heat exchanger 16 receives and acts upon the air prior to its passage through the heat exchanger 18, the former may be identified as the upstream heat exchanger and the latter as the downstream heat exchanger.

An auxiliary condensing heat exchanger 22 is located below duct 10 and in the chamber 23. This chamber is in communication with the cargo space. The auxiliary condensing heat exchanger 22 is mounted within the duct 24 which at one end receives the fan 26 driven by motor 28. At its opposite end the duct 24 discharges into the atmosphere. When the fan 26 is rotated by motor 28, air from the cargo space is drawn through the duct and the heat exchanger 22. As described in further detail hereafter, this action takes place when the system is cooling the cargo space.

A compressor 30 is also disposed in the space 23 and is directly connected by shaft 32 to the auxiliary gasoline engine 34 to be driven thereby.

The compressor 30 is connected by suitable pipes 38a, 38b, 38c, 38d, and 38e to form a closed circulating system for refrigerant through the heat exchangers 18, 22, and 16, in succession. An expansion valve 40 is located at the intake side of the evaporator heat exchanger 16 to provide a pressure differential between these parts and a low pressure in the evaporator heat exchanger in relation to the pressure in the condenser heat exchanger. This expansion valve is of the automatic type capable of varying the area of the orifice as required to maintain a predetermined pressure in the evaporator heat exchanger 16. It may be one of the types well known in the art for this purpose and by its action maintains a constant temperature at evaporator heat exchanger 16.

A liquid receiver or storage tank 42 is located at the discharge end of the auxiliary condenser heat exchanger 22. This receiver is a closed tank connected by inlet valve 44 to heat exchanger 22 and receiving the downturned end of the pipe 38c as shown. The end of pipe 38c extends to a point adjacent the bottom of the receiver 42 so as to discharge through the pipe 38c only the liquid collecting in this receiver.

A strainer 46 is located between pipes 38c and 38d and in the liquid portion of the circulating system to remove impurities from the refrigerant.

The fan motor 28 is energized from a battery or other suitable electric power source (not shown) through the pressure-actuated switch 48. This switch is mounted on the extension 38a' of pipe 38a to partake of the discharge pressure of the compressor 30. This switch may be any one of the types well known in the art which close the electric circuit when a predetermined pressure is exceeded and open the circuit when pressure falls below a predetermined value. For example, in a practical installation using dichlorodifluoromethane as a refrigerant, the switch 48 might be adjusted to close at 200 pounds pressure and open at 195 pounds pressure.

A high pressure cut-out switch 50 is also attached to pipe 38a' to interrupt the ignition circuit of engine 34 to stop the unit if the pressure rises to a dangerous value due to clogging or failure of some part.

Since heat is produced in space 23 by the engine 34, the temperature therein is considerably higher than the cargo temperature during cooling. It is accordingly desirable to provide suitable heat insulated walls 52 for space 23 with apertures only as required to define a passage from the cargo space to the fan 26. A suitable drip pan 54 with an outlet pipe 54a (Figure 3) extending outside the cargo space is provided to discharge condensate from the air cooled by evaporator heat exchanger 16.

The system of Figure 1 operates as follows:

When the air outside the cargo space is warm, so that cooling is required, the air reaching the condenser heat exchanger or coil 18 is relatively warm. This is due to the fact that the air drawn in by the fan 14, whether air from the cargo space, air from outside, or a mixture, is relatively warm. The temperature of the refrigerant in the heat exchanger or coil 18 is consequently relatively high and the pressure at the discharge side of the compressor 30 exceeds the value required to close switch 48 and energize motor 28 to drive fan 26.

Since the fan 26 is energized, air is drawn through the heat exchanger or coil 22 to cool the refrigerant passing therethrough so that the refrigerant upon reaching the receiver 42 is at a considerably lower temperature than at the outlet of either compressor 30 or the heat exchanger 18. In this process the air being exhausted from the cargo space is used for cooling and full advantage is taken of its relatively cool temperature.

The refrigerant then passes through the expansion valve 40 to the evaporator heat exchanger 16 where it expands to cool that heat exchanger and cool the air passing through the duct 10, thereby maintaining the temperature of the air entering the cargo space at the temperature required to maintain the cargo within the desired temperature range.

The condenser heat exchanger 18 is so constructed that the refrigerant passing therethrough does not heat excessively under air cooling operation. In other words, the heat transfer area is so chosen in relation to the velocity of flow of the refrigerant that the system acts to accomplish a net lowering of the air temperature.

If the outer air temperature is low, so that heating of the cargo is required to maintain the desired temperature, the temperature level of the entire system lowers and the pressure in the discharge pipe 38a falls below the opening value for switch 48. Switch 48 accordingly opens and deenergizes motor 28, thus discontinuing the air flow through the heat exchanger 22.

When no air flows through the heat exchanger 22, the quiescent air therein heats to the temperature of the refrigerant flowing therethrough. When this condition is established, the refrigerant undergoes no change in travelling through this heat exchanger and the only effective heating or cooling elements acting on the refrigerant are the evaporator and condenser heat exchangers 16 and 18, the expansion valve 40, and the compressor 30. Of these, the heat exchangers 16 and 18 (and indirectly the expansion valve 40) act only on the air entering the cargo space and the compressor imparts latent heat to the refrigerant which is ultimately released to the air by heat exchanger 18.

The air entering the cargo space when fan 26 is not operating is substantially heated in relation to the air 12. This is due in part to conversion of the mechanical work of the compressor 30 to heat imparted to the air by heat exchanger 18 and in part due to removal of evaporated moisture in the air and conversion of the latent heat thereof into sensible heat of the air. The latter action occurs by reason of the condensation of the water from the air on the coils of heat exchanger 16 and its subsequent collection in pan 54 and discharge. During this cooling process the air, by reason of its moisture content, has relatively great total heat in relation to its temperature and consequently gives up a relatively great quantity of heat in the cooling process. When the air is subsequently heated by the heat exchanger 18, it is in a relatively dry condition at all times, with the incident low value of total heat in relation to temperature. Consequently the same heat that was previously removed from the wet air is capable of heating the dry air to a higher temperature than the initial wet air temperature.

The action last described may be termed dehumidifying heat pump action, as it operates to convert the latent heat of the relatively wet air into sensible heat of the relatively dry air.

It will be observed that the above-described system is completely self-regulating and yet does not embody any temperature-sensitive or complicated automatic operating elements. The system, when once set in motion by starting engine 34, requires no further attention.

Figure 2 shows an alternative embodiment of the present invention utilizing engine exhaust gases as a source of heat. In this embodiment the duct 110 corresponds to duct 10, Figure 1, and contains a fan unit 114 to drive air into the cargo space to be cooled or heated. However, in the unit of Figure 2, the air flow is in the direction of arrow 112 and suitable windows (not shown) are provided to deliver air flowing in this direction from the duct into the cargo space.

The cooling or evaporator coil 116 is disposed in the duct 110 to cool air flowing therethrough. This coil is connected by pipes to form a closed refrigerant-circulating path through the compressor 130, condenser heat exchanger 122, and expansion valve 140, thus defining a refrigerating system wherein heat is removed from air passing through duct 110 and is released to the cooling medium travelling through the heat exchanger 122.

Heat exchanger 122 may be any one of many types well known to the art and may be cooled by any suitable coolant. A convenient form of such heat exchanger is a grill or radiator through which air from the atmosphere (or exhaust air from the cargo space) is propelled by a suitable fan.

The compressor 130 is driven by suitable means, such as a gasoline engine 132 with an automatic starter. The automatic starter includes an electric cranking device which cranks the engine when the thermostat contacts 133 close. Closing of these contacts also closes the ignition circuit to the engine so that when the contacts open in response to low temperature in the cargo space, the engine stops. The cranking mechanism also includes a speed operated switch (not shown) mounted to rotate in unison with the engine, which interrupts the circuit to the starting motor when the engine comes up to speed.

The thermostat 133 is located in position to partake of the temperature of the cargo space. It consists of a fixed contact bar 133a which cooperates with a bimetallic contact bar 133b. When the temperature in the cargo space exceeds the maximum value in the desired range, the bimetal bar 133b flexes to a contact making position in relation to the fixed contact bar 133a to close the circuit and start the engine unit to drive the compressor and cool coil or heat exchanger 116.

A heating heat exchanger or coil 118 is located upstream of the heat exchanger 116 in the duct 110. This heat exchanger is connected by pipes 150 to a heat exchanger 152 to define a closed circulating system as shown.

The heat exchanger 152 consists of a tube 152a adapted to receive the heat exchange fluid flowing in pipe 150 and surrounding the exhaust pipe 154 of the engine. The pipe 154 carries a series of collars or fins of copper or similar good heat conducting material to increase heat flow from the pipe to the medium in the tube 152a.

The exhaust pipe 154 is preferably the exhaust pipe of the main driving engine of the truck carrying the cargo to be heated. Alternatively, it may be the exhaust pipe of any other convenient engine and, if no other engine is available, the engine 132 may be kept operating at all times and its exhaust heat utilized.

If the engine 132 is used to supply exhaust heat, some means, such as a by-pass around the compressor 130 with a solenoid controlled valve, is used to energize and deenergize the refrigerating system in response to cargo temperature.

The closed system defined by heat exchanger 152, pipes 150, and the heating coil 118, is filled with a suitable heat exchange fluid which will circulate to transfer heat from exhaust pipe 154 to the heating coil 118. Dichlorodifluromethane (Freon) is a suitable liquid for this purpose as it evaporates in the tube 152a, travels to the heating coil 118 in the vapor state, and there condenses to impart its latent heat of vaporization to the coil 118.

The heating portion of the system of Figure 2 is energized and deenergized in response to cargo temperature by the thermostat 156 which closes when cargo temperature falls below the desired storage temperature range. Closure of this thermostat energizes the solenoid valve 158 located in the return path for flow of heat exchange liquid from the heating coil 118 to the heat exchanger 152 and is constructed to open this path in the energized state. Consequently, when the cargo temperature is below the desired value, the valve is opened to permit flow of the heat transfer fluid through the system to heat the coil 118.

When the temperature of the cargo space exceeds the lower limit of the desired temperature range, the thermostat 156 opens the circuit to the valve 158, thereby causing that valve to close under the action of springs or other means provided for the purpose. This obstructs the circulating path for the heat exchange fluid which cannot return to the heat exchanger 152 and thus collects in the portion 150a of the pipe 150 and in the heat exchanger 118. The interior of tube 152a and the remaining portions of pipe 150 are then filled with non-circulating heat exchange fluid in the vapor state which gives rise to no effective heat transfer.

Since the heat exchanger or heater 152 is physically below the heat exchanger 118 and the exchanger or heater 152 has tube 152a extending vertically, the above-described circulation occurs by gravity flow.

The thermostat 156 may, for example, consist of a fixed contact blade 156a cooperable with a bimetal contact blade 156b, the whole unit being exposed to the temperature of the cargo space. When the cargo space temperature falls below the lower temperature limit, the blade 156b flexes to establish contact with blade 156a to energize valve 158.

While we have shown the exhaust heating unit of Figure 2 in conjunction with a cooling system of conventional construction, the exhaust heating unit can also be used to supplement the heating action of the combined heating and cooling system of Figure 1, in which case the system as shown in Figure 1 operates to heat or cool the cargo as required with the compressor 30 running continuously and the exhaust heating unit serves to increase the heat input to the cargo under the heating condition, thereby reducing the magnitude and duration of any temperature excursions below the lower temperature limit. The heating coil 118 should, of course, be positioned downstream of coil 18 in the duct 10, Figure 1.

A combined system utilizing the features of the systems of Figures 1 and 2 is shown diagrammatically in Figure 3. It will be noted that air passing through duct 10 in the direction of arrow 12 so as to enter the cargo space passes through heat exchangers 16, 18, and 118 in succession. During the cooling operation heat exchangers 18 and 118 do not substantially heat the air, as pointed out above in connection with Figures 1 and 2, while the cooling heat exchanger 16 does cool the air. During heating operations the heat exchanger 16 cools and dehumidifies the air while heat exchangers 18 and 118 heat the air to a temperature higher than the intake air temperature.

In the system of Figure 3 the thermostat is set to open the valve 158 at a cargo temperature lower than the cargo temperature required to interrupt the flow of coolant to heat exchanger 22. In other words, the auxiliary heat derived from the engine exhaust is not applied except during the time that the portion of the system corresponding to Figure 1 is heating the air travelling through duct 10.

The thermostat 156 must be set to initiate heating at some temperature above the temperature at which the evaporator heat exchanger 116 (or heat exchanger 16 of the system of Figure 1 which is used for cooling) ceases to operate as a cooling device. This is necessary to avoid simultaneous operation of the unit for heating and cooling. In practical installations this temperature difference should be as large as possible to give maximum tolerance for inevitable lost motion ("dead band") in the system.

While we have shown and described the system of the present invention as applied to heating or cooling cargo space in a truck or railroad car, it may also be applied to stationary or moving storage spaces of all types. Regardless of the specific application, the system will maintain the temperature within a storage space in a prescribed temperature range regardless of the variations of outdoor temperature.

While we have shown specific embodiments of the present invention, it will of course be understood that we do not wish to be limited thereto since many variations and alternative constructions may be made without departing from the true spirit and scope thereof. We therefore intend by the appended claims to cover all variations and alternative constructions falling within their true spirit and scope.

What we claim as new and desire to secure by Letters Patent of the United States is:

1. A refrigeration and heating unit operable to heat or cool air flowing through a passage to a cargo space, comprising; upstream and downstream heat exchangers in said passage, each defining a path for refrigerant in thermal proximity to the air in the passage, a compressor having suction and discharge ports, a third heat exchanger thermally remote from said passage and defining a path for refrigerant, means defining a closed path for refrigerant through the heat exchangers and compressor in series, the upstream heat exchanger of the pair being connected to the suction port of the compressor, an expansion valve located at the intake side of said upstream heat exchanger, and means operable in response to the discharge pressure of the compressor to supply coolant to said third heat exchanger when the discharge pressure exceeds a predetermined value.

2. A refrigeration and heating unit operable to heat or cool air flowing through a passage comprising; upstream and downstream heat exchangers in said passage, each defining a path for refrigerant in thermal proximity to the air in the passage, a compressor having suction and discharge ports, a third heat exchanger remote from said passage and defining a path for refrigerant, means defining a closed path for refrigerant through the heat exchangers and compressor in series, the upstream heat exchanger of said pair being connected to the suction port of the compressor, an expansion valve located at the intake side of said upstream heat exchanger to vaporize refrigerant passing therethrough, and means selectively operable to supply coolant to said third heat exchanger, to heat or cool air flowing through the passage as desired.

3. A refrigerating and heating system for air flowing through a passage comprising; evaporating and condensing heat exchangers located at upstream and downstream positions in said passage respectively to receive air flowing therethrough and each having a channel for refrigerant, an auxiliary condensing heat exchanger outside said passage and having a channel for refrigerant, means including a compressor and expansion valve defining a refrigerating system in conjunction with said heat exchangers, and means selectively operable to cool the auxiliary condensing heat exchanger to operate the system selectively as a dehumidifying heat pump or as a refrigerator with respect to air flowing through said passage.

4. A refrigerating and heating system for air flow through a passage comprising, evaporating and condensing heat exchangers located at upstream and downstream positions in said passage respectively to receive air flowing therethrough and each having a channel for refrigerant, an auxiliary condensing heat exchanger located outside said passage and having a channel for refrigerant, means including a compressor and expansion valve defining a refrigerating system in conjunction with said heat exchangers wherein refrigerant evaporates in the evaporating heat exchanger and condenses in the condensing heat exchangers, means selectively operable to cool the auxiliary condensing heat exchanger to operate the system selectively as a dehumidifying heat pump or as a refrigerator with respect to air flowing through said passage, and a liquid reservoir located at the outlet side of the auxiliary condenser.

5. A refrigerating and heating system for air flow through a passage comprising, evaporating and condensing heat exchangers located at upstream and downstream positions in said passage respectively to receive air flowing therethrough and each having a channel for refrigerant, an auxiliary condensing heat exchanger located outside said passage and having a channel for refrigerant, means including a compressor and expansion valve defining a refrigerating system in conjunction with said heat exchangers wherein refrigerant evaporates in the evaporating heat exchanger at substantially constant pressure and condenses in the condensing heat exchangers, and means responsive to the pressure at the discharge of said compressor operative to cool the auxiliary condensing heat exchanger when said pressure exceeds a predetermind value.

6. A refrigerating and heating system for air flowing through a duct comprising; evaporating and condensing heat exchangers located at upstream and downstream positions in said duct respectively to receive air flowing therethrough and each having a channel for refrigerant, an auxiliary condensing heat exchanger adapted to receive air from outside said passage and having a channel for refrigerant, means including a compressor and expansion valve defining a refrigerating system in conjunction with said heat exchangers wherein refrigerant evaporates in the evaporating heat exchanger and condenses in the condensing heat exchangers, means selectively operable to blow air through the auxiliary condensing heat exchanger to operate the system selectively as a dehumidifying heat pump or as a refrigerator with respect to air flowing through said passage, and means responsive to the discharge pressure of the pump operative to energize said last means when said pressure exceeds a predetermined value.

7. A system selectively operable to refrigerate or heat a confined space such as the interior of a truck or railroad car comprising; means defining a passage for intake air flow to said space, evaporating and condensing heat exchangers located at upstream and downstream positions in said passage respectively to receive air flowing therethrough and each having a channel for refrigerant, an auxiliary condensing heat exchanger adapted to receive air and having a channel for refrigerant, means including a compressor and expansion valve defining a refrigerating system in conjunction with said heat exchangers wherein refrigerant evaporates in the evaporating heat exchanger and condenses in the condensing heat exchangers, means selectively operable to blow air through the auxiliary condensing heat exchanger to operate the system selectively as a dehumidifying heat pump or as a refrigerator with respect to air flowing through said passage, and means responsive to the discharge pressure of the compressor operative to energize said last means when said pressure exceeds a predetermined value.

8. A system selectively operable to refrigerate or heat a confined space such as the interior of a truck or railroad car comprising; means defining a passage for intake air flow to said space, evaporating and condensing heat exchangers located at upstream and downstream positions in said passage respectively to receive air flowing therethrough and each having a channel for refrigerant, an auxiliary condensing heat exchanger adapted to receive air and having a channel for refrigerant, means including a compressor and expansion valve defining a refrigerating system in conjunction with said heat exchangers wherein refrigerant evaporates in the evaporating heat exchanger and condenses in the condensing heat exchangers, means adapted to receive air condensate from the evaporator coil and discharge the same externally to the space, means selectively operable to blow air through the auxiliary condensing heat exchanger to operate the system selectively as a dehumidifying heat pump or as a refrigerator with respect to air flowing through said passage, and means responsive to the discharge pressure of the compressor operative to energize said last means when said pressure exceeds a predetermined value.

9. A refrigeration and heating unit operable to heat or cool air flowing through a passage to a cargo space comprising, upstream and downstream heat exchangers in said passage, each defining a path for refrigerant in thermal proximity to the air in the passage, a compressor having suction and discharge ports, a third heat exchanger thermally remote from said passage and defining a path for refrigerant, means defining a closed path for refrigerant through the heat exchangers and compressor in series, the upstream heat exchanger of the pair being connected to the suction port of the compressor, an expansion valve located at the intake side of said upstream heat exchanger, and means operable in response to the discharge pressure of the compressor to exhaust air from the cargo space over the third heat exchanger when the discharge pressure exceeds a predetermined value.

10. A refrigeration and heating unit operable to heat or cool air flowing through a passage to a cargo space, comprising; upstream and downstream heat exchangers in said passage, each defining a path for refrigerant in thermal proximity to the air in the passage, a compressor having suction and discharge ports, a third heat exchanger thermally remote from said passage and defining a path for a refrigerant, means defining a closed path for refrigerant through the heat exchangers and compressor in series, the upstream heat exchanger of the pair being connected to the suction port of the compressor and the downstream heat exchanger being connected to the discharge port of the compressor, an expansion valve located in the intake side of said upstream heat exchanger, means operable in response to the discharge pressure of the compressor to supply coolant to the third heat exchanger when the discharge pressure exceeds a predetermined value, a fourth heat exchanger in the passage downstream of said upstream and downstream heat exchangers defining a path for flow of heat exchange fluid in thermal proximity to air in the passage, an internal combustion engine driving the compressor, a heater adapted to receive exhaust gases from said engine and having a passage for heat exchange fluid in thermal proximity to the exhaust gases, means defining a closed path for heat exchange fluid through said last passage and the passage in said fourth heat exchanger, a valve located at the intake side of said last passage, and thermostatic elements responsive to the temperature of the space operable to open the valve when the temperature falls below the value at which the coolant supplied to said third heat exchanger is discontinued.

References Cited in the file of this patent

UNITED STATES PATENTS

| | | |
|---|---|---|
| 1,779,116 | Davenport | Oct. 21, 1930 |
| 1,837,797 | Shipley | Dec. 22, 1931 |
| 1,837,798 | Shipley | Dec. 22, 1931 |
| 1,943,965 | Hulse | Jan. 16, 1934 |
| 2,154,136 | Parcaro | Apr. 11, 1939 |
| 2,266,238 | Newton | Dec. 16, 1941 |
| 2,497,450 | Gygax | Feb. 14, 1950 |
| 2,536,248 | Alexander | Jan. 2, 1951 |
| 2,551,758 | Newton | May 8, 1951 |

FOREIGN PATENTS

| | | |
|---|---|---|
| 141,819 | Switzerland | Aug. 31, 1930 |